Oct. 1, 1963  P. J. SCRAY ETAL  3,105,464
BIRD INSECTICIDE DISPENSER
Filed April 12, 1962

INVENTOR,
CARY CREWS &
PETER J. SCRAY
BY
*Clarence A. O'Brien*
*and Harvey B. Jacobson*
Attorney

United States Patent Office 3,105,464
Patented Oct. 1, 1963

3,105,464
BIRD INSECTICIDE DISPENSER
Peter J. Scray, 6626 Aires Road, and Cary Crews, 5411 Kinkaid Road, both of Jacksonville 10, Fla.
Filed Apr. 12, 1962, Ser. No. 187,020
7 Claims. (Cl. 119—160)

This invention relates to new and useful improvements in bird insecticide dispensers for use particularly in cages and has for its primary object to provide a device of this character which is adapted to be mounted on a swinging perch actuated by a live bird to swing back and forth therewith in a manner to utilize the air currents and turbulence thus created for disseminating chemical fumes generated in the dispenser.

Another highly important object of the present invention is to provide an insecticide dispenser of the aforementioned character which will function as a companion to the live bird in the cage, thus preventing loneliness and otherwise promoting the well-being of the caged bird.

Other objects of the present invention are to provide a combined insecticide dispenser and bird companion of the character described which is comparatively simple in construction, strong, durable, compact, of light weight, attractive in appearance and which may be manufactured at low cost.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

Figure 1:
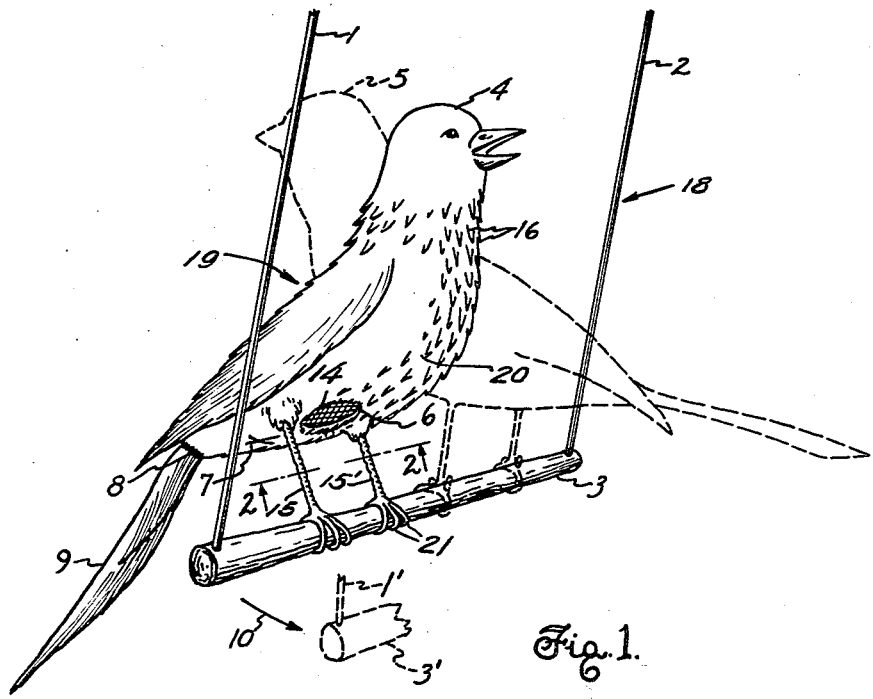
FIGURE 1 is a perspective view, showing a combined insecticide dispenser and bird companion embodying the present invention in use.

Referring now to the drawing in detail, it will be seen that reference character 18 designates generally a conventional bird cage perch of the swinging type. The perch 18 includes a straight, rigid, horizontal rod or bar 3 of suitable wood which is supported by suspension wires 1 and 2. A live bird on the rod 3 is indicated at 5

The embodiment of the present invention which has been illustrated comprises a decoy in the form of an artificial bird which is designated generally by reference numeral 19. The bird 19, which is preferably a representation of the live bird 5, includes a hollow body 20 of plastic or other suitable material having on one end a head 4. Fixed at 8 in the other or rear end of the body 20 are tail feathers 9. Flocking or cotton fibers 16 are provided on the body 20.

Fixed beneath the body 20 and depending therefrom are supporting legs 15 and 15'. Claws or talons 21 are provided on the lower ends of the legs 15 and 15'. The claws or talons 21 are bendable around the rod 3 of the perch 18 for fixedly securing the artificial bird 19 in position on top of said rod for swinging movement therewith. The artificial bird 19 is spaced from one end of the rod 3 in a manner to accommodate the live bird 5 therebetween.

Adjacent the legs 15 and 15' the lower portion of the body 20 has formed therein a circular opening or window 6. A screen 14 of wire, cloth or other suitable material covers the opening 6. A ridge or flange 17 secures the screen 14 in position.

Figure 2:
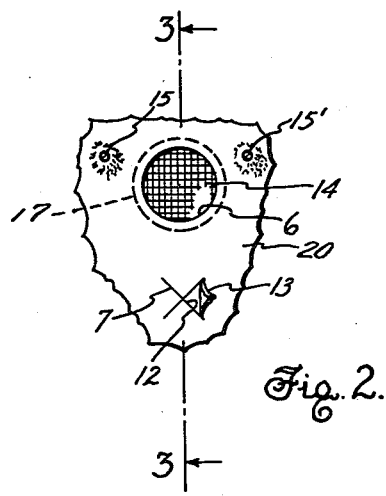
FIGURE 2 is a fragmentary view in horizontal section on an enlarged scale taken substantially on the line 2—2 of FIGURE 1.
Figure 3:
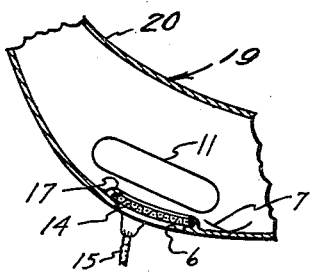
FIGURE 3 is a fragmentary view in vertical longitudinal section, taken substantially on the line 3—3 of FIGURE 2.

The hollow body 20 is for the reception of a disinfecting chemical in solid form as indicated at 11. The disinfecting chemical, which has been shown is in the form of a cake, tablet or pill. To insert the chemical 11 the lower portion of the body 20 is provided, rearwardly of and adjacent to the opening 6, with crossed or intersecting slits 7 (see FIGURE 2). The slits 7 provide substantially triangular flaps 13 which normally close an opening 12 in the body 20.

It is thought that the use of the device will be readily apparent from a consideration of the foregoing. Briefly, the solid disinfecting chemical 11 is inserted in the hollow body 20 through the opening 12 which, as above stated, is normally closed by the resilient flaps 13. The artificial bird 19 is then mounted on the rod 3 of the perch 18 by bending the claws 21 around said rod. Of course, the artificial bird 19 is mounted on the rod 3 adjacent one end thereof to leave room for the bird 5. The perch 18 is caused to swing when the bird 5 alights thereon, as will be apparent. As the perch 18 swings in one direction with the natural and artificial birds thereon air is forced into the body and expels chemical fumes therefrom in an obvious manner. When the perch 18 swings in the opposite direction a partial vacuum is created which draws chemical fumes out of the body 20. In this manner the live bird 5, standing on the rod 3 close to the artificial bird 19, is thoroughly fumigated. Furthermore, by reason of its realistic appearance, the artificial bird 19 serves as a companion to the caged bird 5 and prevents loneliness. Also, the artificial bird functions as a decoy for attracting the live bird to the perch alongside said artificial bird to be treated by the fumes emanating from said artificial bird. Furthermore, the construction and arrangement is such that the perch 18 will also be disinfected or fumigated.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A caged bird companion and fumigator comprising, in combination, a swinging perch operable by a caged bird and including a straight, rigid, horizontal rod and an artificial bird fixedly mounted on top of said rod for swinging movement therewith along side a caged bird thereon and providing a vehicle for a fumigant to be disseminated in the air as said artificial bird passes therethrough.

2. A bird companion and fumigator comprising, in combination, a swinging perch to be occupied and actuated by a live bird and including a straight, rigid, horizontal rod, an artificial bird fixedly mounted on top of said rod for swinging movement therewith alongside a live bird thereon and for attracting the live bird thereto, and a fumigant carried by the artificial bird to be disseminated in the adjacent air in response to movement of said artificial bird therethrough.

3. A bird fumigator and companion comprising, in combination, a swingable perch for actuation by a bird and including a straight, rigid, horizontal rod, and a decoy for the bird fixedly mounted on top of said rod for swinging movement therewith adjacent to and alongside the bird, said decoy being spaced from one end of the rod for receiving the bird therebetween and including a substantially hollow body for the reception of a fumigant to be disseminated therefrom in response to movement of said decoy through the air.

4. The combination of claim 3, said body having at least one opening therein for the discharge of the fumigant therefrom.

5. The combination of claim 3, said body having a screened opening therein for the escape of the fumigant therefrom.

6. The combination of claim 3, said body having an opening therein for the insertion of the fumigant, and normally closed closure means for the opening, said closure means including resilient coacting flaps integral with the body.

7. The combination of claim 6, said body further having a screened opening therein for the discharge of the fumigant therefrom.

References Cited in the file of this patent

UNITED STATES PATENTS

| | | |
|---|---|---|
| 1,662,742 | Glassman | Mar. 3, 1928 |
| 2,306,076 | Mullen | Dec. 22, 1942 |
| 2,707,936 | Kiehl | May 10, 1955 |
| 2,808,030 | Costango | Oct. 1, 1957 |